Nov. 26, 1963
H. GOLDBERG
3,112,481
CONTINUOUS WAVE FREQUENCY MODULATION
DISTANCE MEASURING APPARATUS
Filed Dec. 20, 1957
4 Sheets-Sheet 1
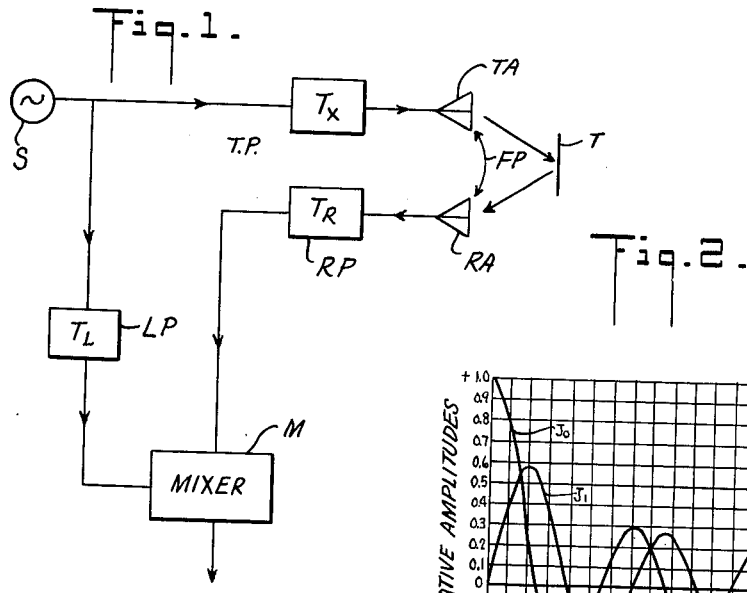
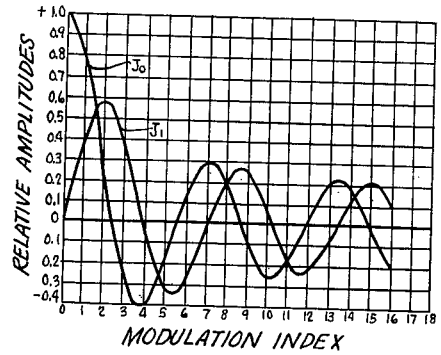
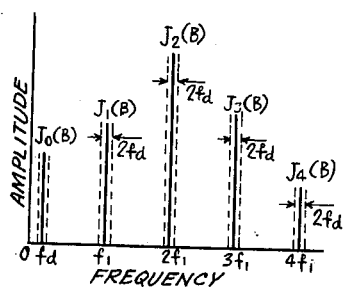
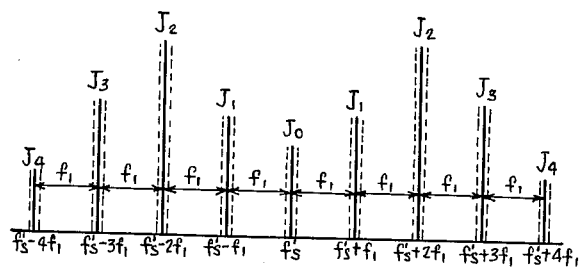
INVENTOR.
HAROLD GOLDBERG
BY
Derby & Darby
ATTORNEYS

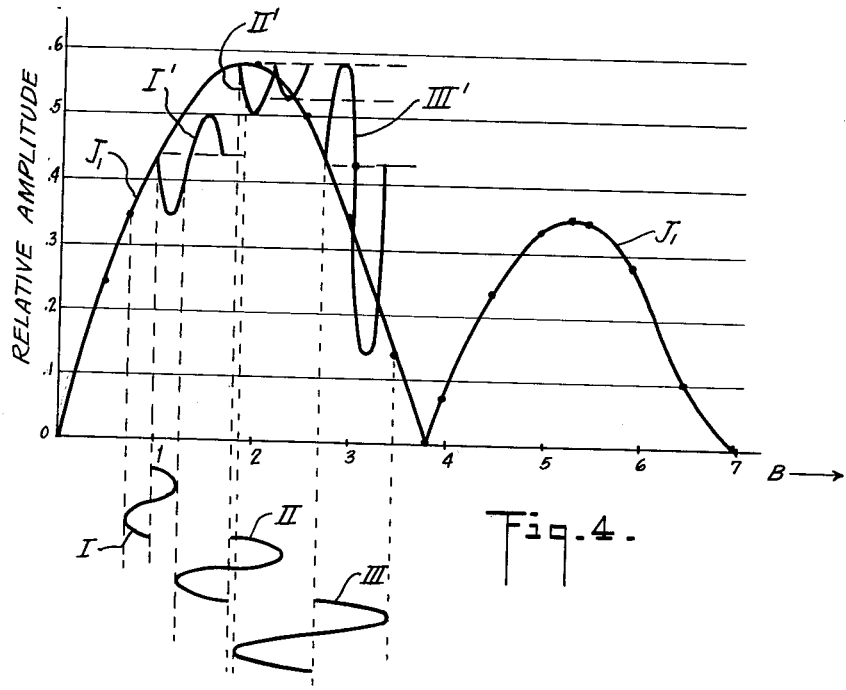
Fig. 4.
Fig. 7
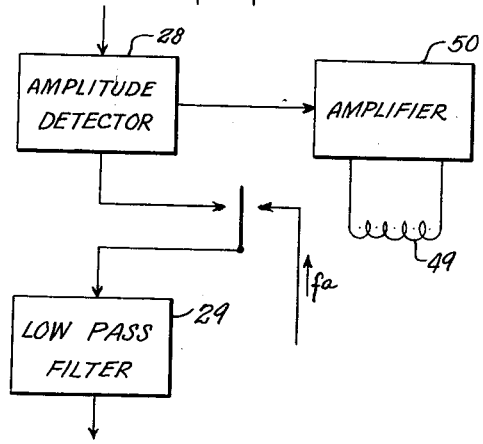
INVENTOR.
HAROLD GOLDBERG
BY
*Darby & Darby*
ATTORNEYS INVENTOR.
HAROLD GOLDBERG
BY
Darby & Darby
ATTORNEYS INVENTOR.
HAROLD GOLDBERG
BY
Darby & Darby
ATTORNEYS United States Patent Office 3,112,481
Patented Nov. 26, 1963

3,112,481
CONTINUOUS WAVE FREQUENCY MODULATION DISTANCE MEASURING APPARATUS
Harold Goldberg, Washington, D.C., assignor, by mesne assignments, to Litton Systems, Inc., a corporation of Maryland
Filed Dec. 20, 1957, Ser. No. 704,153
21 Claims. (Cl. 343—14)

The present invention relates to the art including radio terrain clearance indicators, radio altimeters, and radio distance and velocity indicating apparatus, and is more particularly concerned with such apparatus utilizing continuous-wave frequency-modulated signals. The present invention constitutes an improvement and extension of the invention described in the prior copending application of Harold Goldberg, Serial No. 614,491, filed October 8, 1956, and now abandoned, for "Self-Correlated Frequency-Modulation Continuous-Wave Distance-Measuring Systems."

In this prior application an improved form of FM/CW distance measuring apparatus is described operating on a new principle by which the effects of feedthrough from transmitting antenna to receiving antenna and the effects of "step error" are avoided. In essence this prior system radiates a continuous wave signal frequency-modulated at a predetermined modulating frequency. The reflected return wave is mixed with a local signal in the form of an attenuated version of the original transmitted wave, one of the transmitted, reflected or local waves being frequency-translated or shifted, preferably by means of a special continuous or stepwise linear phase-shifting device. As a result of this operation the output of the mixer constitutes a signal which is a frequency-modulated wave from which altitude or distance information can be derived, preferably in the form of an output signal of the original modulating frequency. This output signal can be used to indicate distance directly or in a preferred form is used to vary the frequency deviation of the frequency modulation process at the transmitter to maintain constant amplitude of the output signal. The amount of variation of this frequency deviation is then an indication of distance.

The present application discloses a system utilizing the same principles as are disclosed in the prior application No. 614,491 and derives the advantages disclosed therein. According to one feature of the invention, the mixer output has its carrier component suppressed which results in the advantage of reduction of feed-through defects. According to another feature, one component of the mixer output is selected, and that component is then automatically maintained in a fixed condition with respect to a particular characteristic, which, for example, may be having that component maintained at zero amplitude as disclosed in the parent application or maintained at a peak amplitude as in the present application.

By other features of the present invention, means are provided for assuring that, in the absence of mixer output, as when the system is not in operation or has failed, the distance reading will be at maximum, and means are provided for assuring that the correct peak of the characteristic is the one which is maintained at maximum amplitude.

In part the advantages of the present invention are obtained by recognizing that the mixer output of the present system has the waveform of a frequency-modulated wave whose frequency deviation and modulation index contain distance or range information; according to specific features of this invention, the frequency deviation or modulation index are utilized to provide this range information, and more specifically the range information is derived by maintaining the modulation index of the mixer output at a constant value corresponding to a zero or maximum of the amplitude of a selected component of the mixer output.

According to a further and important feature of the invention, the modulating signal which is used to produce the frequency modulation of the transmitted wave is itself varied in amplitude, as by amplitude modulation, and this amplitude modulation is utilized to obtain further advantages of the present invention. The present invention is also concerned with particular ways of maintaining automatic "lock-in" and of determining the rate of change of range or distance.

The specific objects and advantages of the present invention will become apparent from the following description of a preferred form thereof, taken in conjunction with the appended drawings, in which FIG. 1 is a schematic block diagram useful in explaining certain of the principles of the present invention;

FIG. 2 is a graph of the amplitudes of the carrier and the first order side band components as a function of modulation index, similarly useful;

FIGS. 3A and 3B are charts showing the spectral distribution of side band components similarly useful;

FIG. 4 is a graph showing the effect of periodic variation of modulation index in accordance with one aspect of the present invention;

FIG. 7 is a fragmentary schematic block diagram of a modification of the system of FIG. 5.

Figure 5:
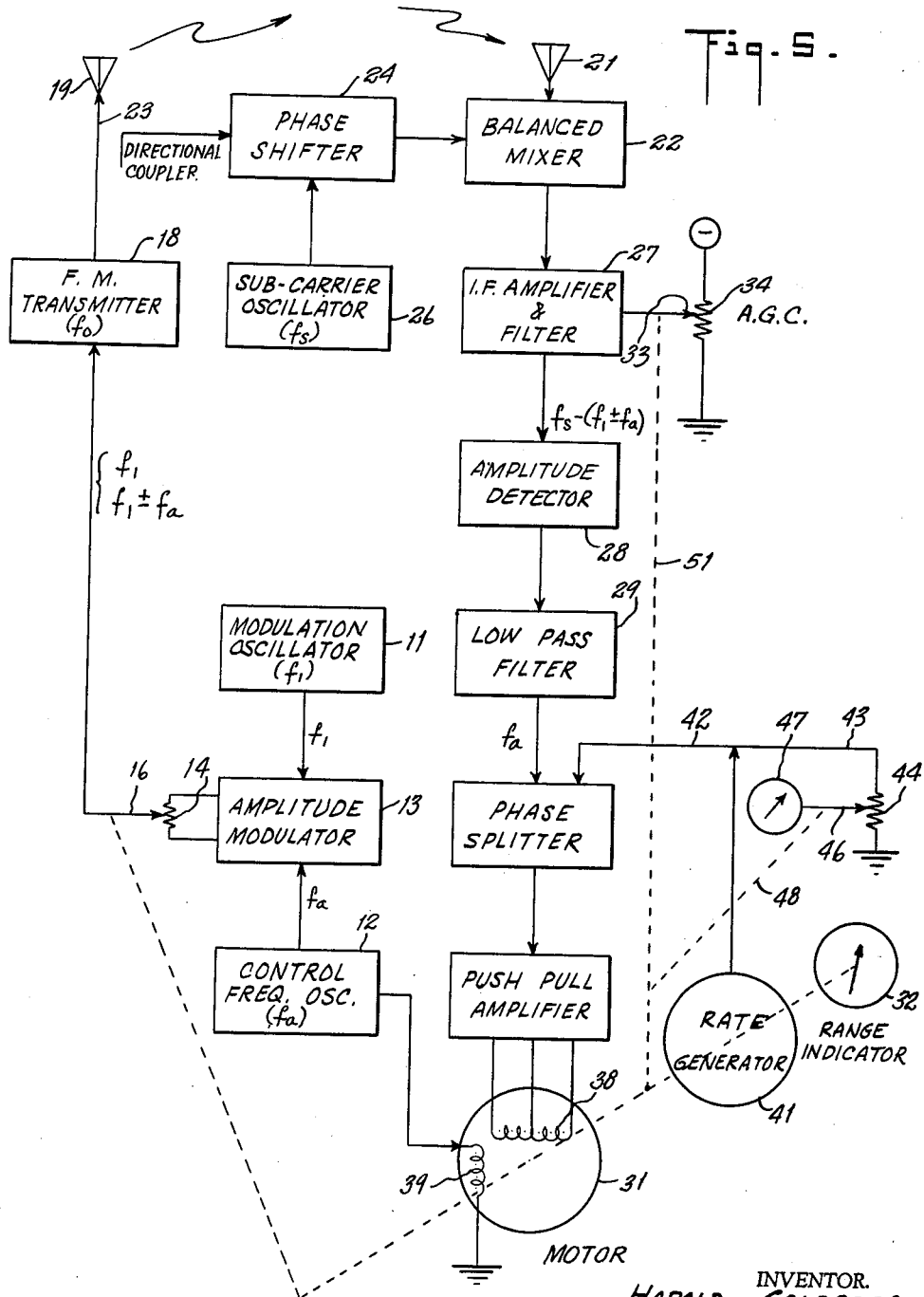
FIG. 5 is a schematic block diagram of one form of system according to the present invention.

The present invention will be first described in general principle with respect to FIG. 1, illustrating in schematic form the radio-frequency portion of the system.

A signal source S supplies its signal through a transmission path TP having a time delay $T_x$ to a transmitting antenna TA by which the signal is radiated over a path of length (range) R to a distant target or body T which reflects the signal to a receiving antenna RA over a like distance R. The reflecting body (which may be the ground or other terrain) introduces a phase shift $\phi_T$ which may be a function of time. The received signal derived from receiving antenna RA is fed through a reception path RP having a time delay $T_R$ to a mixer M to which is also supplied a signal derived from source S over a local path LP having a time delay $T_L$.

The source S radiates a signal generally expressed by:

$$S_0(t) = \cos[\phi_0(t)] \qquad (1.1)$$

where $\phi_0(t)$ is a phase function of time $t$ and time is referenced to the source S. In view of the time delay $T_x$ associated with the transmission path, at the transmitting antenna terminals the energy may be described as $$S_X(t) = A_X \cos[\phi_0(t - T_X)] \qquad (2.1)$$

where $A_X$ is an amplitude factor. In view of the transit time to the reflecting body at a distance R, the energy incident on the target may be described as $$S_I(t) = A_I \cos\left[\phi_0\left(t - T_X - \frac{R}{c}\right)\right] \qquad (2.2)$$

where $A_I$ is an amplitude factor and $c$ is the velocity of light.

After reflection, the energy incident on the receiving antenna RA is $$S_T(t) = A_T \cos\left[\phi_0\left(t - T_X - \frac{2R}{c}\right) + \phi_T\left(t - \frac{R}{c}\right)\right] \qquad (2.3)$$

where $\phi_T$ is any time-varying phase shift produced by reflection from the distant body, and $A_T$ is an amplitude factor.

The energy fed to the mixer via the reception path RP is then $$S_R(t) = A_R \cos\left[\phi_0\left(t - T_X - \frac{2R}{c} - T_R\right) + \phi_T\left(t - \frac{R}{c} - T_R\right)\right] \quad (2.4)$$

where $A_R$ is an amplitude factor.

The energy fed to the mixer via the local path is $$S_L(t) = A_L \cos[\phi_0(t - T_L)] \quad (2.5)$$

where $A_L$ is an amplitude factor.

In Equations 2.1 to 2.5, the series of coefficients $A_X$, $A_I$, $A_T$, $A_R$, and $A_L$, modifying the time variable functions, represent the attenuation sequence that the transmitted energy goes through in passage from the source to the mixer. The mixer is preferably of the balanced diode type, and operates by detecting the envelope of the input signal. The input signal, in this case, is $$S_L(t) + S_R(t)$$

If two functions of the form $a \cos A$ and $b \cos B$ are added, it may be shown by simple trigonometric manipulation that $$a \cos A + b \cos B$$
$$= \sqrt{a^2 + b^2 + 2ab \cos \Delta} \cos\left(A - \tan^{-1} \frac{b \sin \Delta}{a + b \cos \Delta}\right) \quad (3.1)$$

where $\Delta = A - B$.

The detected envelope corresponds to the amplitude of the right hand side of this equation and is given by $\sqrt{a^2 + b^2 + 2ab \cos \Delta}$. Wherever $a$ is much greater than $b$, the following approximation is possible:

$$\sqrt{a^2 + b^2 + 2ab \cos \Delta} \cong a + b \cos \Delta \quad (3.2)$$

Thus, if one lets $a = A_L$, $b = A_R$, $$\Delta = \phi_0(t - T_L) - \phi_0\left(t - T_X - T_R - \frac{2R}{c}\right) - \phi_T\left(t - T_R - \frac{R}{c}\right)$$

and notes that $A_L$ is much greater than $A_R$ in a practical system, then the output of the mixer is given by $$S_M(t) = S_L(t) + S_R(t) = A_L + A_R \cos \Delta \quad (3.3)$$

By defining a new variable, $t' = t - T_L$ time may be referenced to the mixer output. The mixer output is now given by $$S_M(t') = A_L + A_R \cos\left[\phi_0(t') - \phi_0\left(t' + T_L - T_X - T_R - \frac{2R}{c}\right) - \phi_T\left(t' + T_L - T_R - \frac{R}{c}\right)\right] \quad (3.4)$$

For simplication a new composite time delay T and phase shift function $\Phi(t')$ are defined as $$T = T_X + T_R + \frac{2R}{c} - T_L \quad (3.5)$$

and $$\Phi(t') = -\phi_T\left(t' + T_L - T_R - \frac{R}{c}\right) \quad (3.6)$$

T is actually the total time delay over the transmission loop from source to mixer less the delay over the local path LP. Therefore, the mixer output may now be written as $$S_M(t') = A_L + A_R \cos[\phi_0(t') - \phi_0(t' - T) + \Phi(t')] \quad (3.7)$$

If the source signal $S_0(t)$ is considered to be a sinusoidal carrier of angular frequency $\omega_0$ to which is swung over a range $\Delta\omega_0$ according to a function $\omega_1$ of time, the total phase change of the signal $S_0$ over a given time increment from an arbitrary initial time $t_0$ to time $t'$ may now be defined in terms of the time integral of the instantaneous angular velocity as $$\phi_0(t') = \int_{t_0}^{t_1} [\omega_0 + \Delta\omega_0 \omega_1(t)] dt$$
$$= \omega_0(t' - t_0) + \Delta\omega_0 \int_{t_0}^{t_1} \omega_1(t) dt$$
$$= \omega_0(t' - t_0) + \Delta\omega_0[W_1(t') - W_1(t_0)] \quad (4.1)$$

where $W_1(t) = \int \omega_1(t) dt$

Therefore, $$\phi_0(t') - \phi_0(t' - T) = \omega_0(t' - t_0) + \Delta\omega_0[W_1(t') - W_1(t_0)]$$
$$- \omega_0(t' - t_0 - T) - \Delta\omega_0[W_1(t' - T) - W_1(t_0)]$$
$$= \omega_0 T + \Delta\omega_0[W_1(t') - W_1(t' - T)]$$

Substituting this relationship into Eq. 3.7 results in $S_M(t')$ $$= A_L + A_R \cos[\omega_0 T + \Delta\omega_0 W_1(t') - \Delta\omega_0 W_1(t' - T) + \Phi(t')] \quad (4.2)$$

If a sinusoidal modulation is employed in the system, then $\omega_1(t) = \cos \omega_1 t$ and $$W_1(t') = \frac{-\sin \omega_1 t}{\omega_1}$$

Equation 4.2 can now be written as $$S_M(t') = A_L + A_R \cos\left[\omega_0 T + \frac{\Delta\omega_0}{\omega_1} \sin \omega_1 t' - \frac{\Delta\omega_0}{\omega_1} \sin \omega_1(t' - T) + \Phi(t')\right] \quad (4.3)$$

This can be trigonometrically simplified to $$S_M(t') = A_L + A_R \cos\left[\omega_0 T + \frac{2\Delta\omega_0}{\omega_1} \sin \frac{\omega_1 T}{2} \cos \omega_1\left(t' - \frac{T}{2}\right) + \Phi(t')\right] \quad (4.4)$$

Referring to Equation 3.5 above, it is apparent that T is a function of the range R. Referring to Equation 4.4, the range R is contained in two of the terms of interest in the bracketed expression, namely, in $$\sin \frac{\omega_1 T}{2} \quad (4.5)$$

and in $$\cos \omega_1\left(t_1 - \frac{T}{2}\right) \quad (4.6)$$

The first term (4.5) contains range R in the function defining the amplitude or magnitude of the phase of the signal $S_M$. The second term (4.6) contains range R in the function defining the phase of a periodic variation of the phase of $S_M$. Therefore distance measurement or ranging can be carried out in two ways, either by measuring the amplitude of $$\frac{2\Delta\omega_0}{\omega_1} \sin \frac{\omega_1 T}{2} \quad (4.7)$$

or by measuring the phase of phase variation (4.6). While phase measurement is independent of the frequency modulation characteristics of the transmitter tube and depends only upon $\omega_1$, measurement of phase shift gives rise to an undesirable error fixed in terms of the maximum phase shift. Accordingly the present invention utilizes the term (4.7) as a measure of distance.

Since the bracketed expression of Equation 4.4 represents the complex phase function of the cosine term of $S_M(t')$, the instantaneous frequency of $S_M(t')$ may be obtained by time-differentiation of this phase function, so that $$f_{inst.} = f_0\dot{T} + \Delta f_0\dot{T} \cos \frac{\omega_1 T}{2} \cos \omega_1\left(t' - \frac{T}{2}\right)$$
$$-2\Delta f_0\left(1 - \frac{\dot{T}}{2}\right) \sin \frac{\omega_1 T}{2} \sin \omega_1\left(t' - \frac{T}{2}\right) + \frac{1}{2\pi}\dot{\Phi}(t')$$

(5.2)

where the dots over T and Φ designate time derivatives. From (3.5) above it is apparent that $$\dot{T} = \frac{2\dot{R}}{c} = \frac{2V}{c} \quad (5.3)$$

where V is the relative velocity of radar apparatus and reflecting body. Therefore $$f_0\dot{T} = \frac{2Vf_0}{c} = \frac{2V}{\lambda} \quad (5.4)$$

which is the well known expression for the doppler frequency $f_D$. For velocities V of practical significance, $V/c$ is much less than unity so that $$1 - \frac{\dot{T}}{2} = 1 - \frac{V}{C} \cong 1 \text{ and } \dot{T} = \frac{V}{c} \cong 0$$

Assuming also that $\dot{\Phi}(t')$ in (5.2) is zero for the moment, then $$f_{inst.} = f_D - 2\Delta f_0 \sin \frac{\omega_1 T}{2} \sin \omega_1\left(t' - \frac{T}{2}\right) \quad (5.5)$$

which shows that $S_M(t')$ appears to have the waveform of a conventional frequency-modulated signal of carrier $f_D$ with deviation of $$2\Delta f_0 \sin \frac{\omega_1 T}{2}$$

and a sinusoidal modulation signal of frequency $\omega_1/2\pi$ and phase $\omega_1 T/2$. However, this is true only if $f_D$ is greater than the deviation. In order to assure that this condition applies, as described in the above-mentioned application Serial No. 614,491, one of the phase shifts $\phi_X(t')$, $\phi_R(t')$ or $\phi_L(t')$ is effectively caused to have a constant rate of change with time, causing $$\frac{\dot{\Phi}(t')}{2\pi} \text{ to equal } f_s$$

Then $$f_{inst.} = f_D + f_s - 2\Delta f_0 \sin \frac{\omega_1 T}{2} \sin \omega_1\left(t' - \frac{T}{2}\right) \quad (5.6)$$

With $f_D + f_s (= f'_s)$ greater than the deviation, the signal $S_M$ has the waveform of a conventional FM wave with a modulating signal of frequency $f_1$ and a modulation index of $$\frac{2\Delta f_0}{f_1} \sin \frac{\omega_1 T}{2} \quad (5.7)$$

Since T is a function of R, the modulation index will vary with the distance being measured.

In Equation 4.4 let $\mu = \omega_0 T + \Phi(t')$, and $$B = \frac{2\Delta\omega_0}{\omega_1} \sin \frac{\omega_1 T}{2}$$

and $$p = \omega_1\left(t' - \frac{T}{2}\right)$$

Then $$S_M(t') = A_L + A_R \cos (\mu + B \cos p)$$
$$= A_L + A_R \cos \mu \cos (B \cos p)$$
$$- A_R \sin \mu \sin (B \cos p) \quad (6.1)$$

A simplification of this expression is possible with the aid of the following expansions:

$$\cos (B \cos p) = J_0(B)$$
$$-2[J_2(B) \cos 2p - J_4(B) \cos 4p + \ldots]$$

$$\sin (B \cos p)$$
$$= 2[J_1(B) \cos p - J_3(B) \cos 3p + \ldots] \quad (6.2)$$

Substituting these expansions into Equation 6.1 gives $$S_M(t') = A_L + A_R[\cos \mu J_0(B) - 2 \sin \mu J_1(B) \cos p$$
$$-2 \cos \mu J_2(B) \cos 2p + 2 \sin \mu J_3(B) \cos 3p$$
$$+2 \cos \mu J_4(B) \cos 4p - \ldots] \quad (6.3)$$

The above expression may also be written $$\frac{S_M(t')}{A_R} = \frac{A_L}{A_R}$$
$$+ J_0(B) \cos \mu$$
$$- J_1(B) \sin (p+\mu) + J_1(B) \sin (p-\mu)$$
$$- J_2(B) \cos (2p+\mu) - J_2(B) \cos (2p-\mu)$$
$$+ J_3(B) \sin (3p+\mu) - J_3(B) \sin (2p-\mu)$$
$$+ J_4(B) \cos (4p+\mu) + J_4(B) \cos (4p-\mu)$$
$$+ \ldots$$

The angle $\mu = \omega_0 T + \Phi(t')$ may be associated with the doppler frequency shift $f_D$ of the return signal resulting from phase changes with time of the return signal caused by relative motion between missile and target. When the return can be considered to originate from a single point on the target, $\mu$ may be written $$\mu = R_0 - \omega_d t' + \Phi(t') \quad (6.5)$$

where $R_0$ is a constant and $\omega_d$ is the angular doppler frequency $2\pi f_D$.

The mixer output then becomes $$\frac{S_M(T')}{A_R} = \frac{A_L}{A_R}$$
$$+ J_0(B) \cos [\omega_d t' - R_0 + \Phi(t')]$$
$$- J_1(B) \sin \left[(\omega_1 - \omega_d)t' + R_0 - \Phi(t') - \frac{\omega_1 T}{2}\right]$$
$$+ J_1(B) \sin \left[(\omega_1 + \omega_d)t' - R_0 + \Phi(t') - \frac{\omega_1 T}{2}\right]$$
$$- J_2(B) \cos [(2\omega_1 - \omega_d)t' + R_0 - \Phi(t') - \omega_1 T]$$
$$- J_2(B) \cos [(2\omega_1 + \omega_d)t' - R_0 + \Phi(t') - \omega_1 T]$$
$$+ J_3(B) \sin \left[(3\omega_1 - \omega_d)t' + R_0 - \Phi(t') - \frac{3\omega_1 T}{2}\right]$$
$$- J_3(B) \sin \left[(3\omega_1 + \omega_d)t' - R_0 + \Phi(t') - \frac{3\omega_1 T}{2}\right]$$
$$+ J_4(B) \cos [(4\omega_1 - \omega_d)t' + R_0 - \Phi(t') - 2\omega_1 T]$$
$$+ J_4(B) \cos [(4\omega_1 + \omega_d)t' - R_0 + \Phi(t') - 2\omega_1 T]$$
$$+ \ldots$$

(6.7)

where $$B = \frac{2\Delta f_0}{f_1} \sin \frac{\omega_1 T}{2} = \frac{2\Delta \omega_0}{\omega_1} \sin \frac{\omega_1 T}{2} \quad (6.8)$$

and is the modulation index. The various Bessel functions $J_0$, $J_1$, $J_2$, etc. vary differently with values of B, as shown in FIG. 2 for $J_0$ and $J_1$. The spectral distribution of energy in the mixer output signal $S_M$ as a function of frequency is shown in FIG. 3A, for a particular value of the modulation index B and, assuming that $f_D$ is much less than $f_1$, and $\dot{\Phi}(t') = 0$, the energy of this signal appears as spectral lines or bands centered multiples of the modulation frequency of $f_1$. However, for the desired condition that $f_D + f_s = f'_s$ is greater than $f_1$, the situation is as in FIG. 3B, with a spectrum centered at the doppler-modified phase shift frequency $f'_s$ (which is the carrier component) and having side frequencies differing from $f'_s$ by integral multiples of the modulating frequency $f_1$. Each of the side frequencies has an amplitude given by the value of a respective Bessel function $J_1$, $J_2$, etc. For a given doppler frequency $f_D$, and assuming that the return originates from a single spot on the target, the spectral lines in FIG. 3A are displaced an amount $f_D$ on either side of each harmonic of $f_1$. When the return signal is composed of components having different doppler frequencies, due to differing velocities between the transmitter and reflecting body, the energy is spread over a band on either side of each harmonic of $f_1$, the band having a width equal to twice $f_D$. In FIG. 3B, for multiple returns, each spectral line becomes a band of width twice $f_D$.

The foregoing principles form the basis for the above-mentioned prior patent application Serial No. 614,491. In particular, in the prior application, a system is disclosed in which, in order to avoid the effects of direct feed through from transmitting to receiving antenna, as along path FP of FIG. 1, the lowest frequency component of the signal derived from the mixer was suppressed either by filtering or use of single sideband or by automatically maintaining the modulation index B of Equation 6.8 at the value 2.40 (for which $J_0(B)$ is zero), despite variations in range R. The amount of variation of carrier frequency deviation $\Delta f_0$ required for this then served as an indication of range R. The present invention includes a generally similar but specifically different system, utilizing some of the same principles, in which departs from this condition for reasons and advantages that will become apparent from consideration of the following further description.

The present system indicates range by a different way of maintaining the modulation index B at a fixed value and thereby gains a number of advantages. In particular it has been found advantageous to maintain B at the value 1.84 for which the Bessel function $J_1(B)$ of the first order or maximum. A particularly simple and advantageous way of accomplishing this is provided which additionally affords the advantage of maintaining a non-ambiguous indication and preventing the system from "locking in" on an incorrect range when first starting up, while maintaining the immunity against the effects of the feedthrough.

In particular, as will be seen, the present system is able to measure range by using only a single spectral line, permitting use of a simple intermediate frequency circuit which is relatively narrowly tuned, and hence rejects feedthrough to a greater extent than in the prior system, and is simpler to design and construct.

As seen in FIG. 2 the Bessel function $J_0$ of the zero order to whose first zero value 2.40 the system of the former application was synchronized has a number of zero points of practical significance. If, when the system was first started up, the indicator should happen to have a reading adjacent one of these zeros not corresponding to the actual altitude, the system might lock in on this incorrect zero and continuously thereafter register an incorrect altitude. The present system avoids this in the following way.

According to the present system, the frequency deviation $\Delta f_0$ of the transmitter is periodically varied at a low frequency $f_a$ which may have any value less than $\frac{1}{2}f_1$, and representatively may be 400 cycles per second. Thus the frequency deviation $\Delta f_0$ now becomes $$\overline{\Delta f_0}(1 - m \cos \omega_a t)$$

where $\overline{\Delta f_0}$ is the average deviation and $m$ is an amplitude modulation index. As a result both the modulation index B and the deviation $\Delta f_0$ are no longer constant even for a particular range but are varied about respective average values at the frequency $f_a$. As already seen, this variation of B will produce a corresponding variation in the amplitude of each of the side bands of FIG. 3B, and particularly of the first order side band whose amplitude is proportional to $J_1(B)$. The result is an amplitude modulation of the first order side band which can be used for maintaining the average value of B at 1.84, for which the first order side band has maximum amplitude, by correspondingly adjusting $\Delta f_0$.

The curve $J_1$ of FIG. 4 illustrates the variation with B of the absolute value of the first order Bessel function $J_1$. It will be observed that $$B = \frac{2\Delta f_0}{f_1} \sin \pi f_1 T$$

Substituting $$\frac{2R}{c}$$

for T, for small values of the angle this expression to a close approximation becomes $$B = \frac{4\pi \Delta f_0 R}{c}$$

where the frequency deviation $\Delta f_0$ is made to vary at the frequency $f_a$. The amount of this variation, which is the amplitude modulation index $m$, may be chosen to have a suitably advantageous value as discussed below.

FIG. 4 shows generally the operation for a particular value of R and different values of average transmitter frequency deviation for which the average values of B would be, say, 1, 1.84 (for which the Bessel function $J_1$ has a maximum value) and 2.7.

In the first case, with, say, $m=30\%$ variation in $\Delta f_0$, B would range from .7 to 1.3 as at I in FIG. 4. This deviation causes a variation at the frequency $f_a$ in the amplitude of the first order side frequency, as shown at I' in FIG. 4.

In the second case, R has a value such that the average value of B equals 1.84. For the same percentage variation of the frequency deviation $\Delta f_0$, the modulation index B now ranges from 1.3 to 2.4 as shown at II in FIG. 4. Under these conditions, the first order side band varies its amplitude essentially at double the frequency $f_a$, as shown at II' in FIG. 4.

If an average value of 2.7 is assumed for B, with the same 30% frequency deviation variation as before, B will now vary between 1.9 and 3.5 as at III and the first order side frequency amplitude will vary as illustrated at III' in FIG. 4. It is again essentially of frequency $f_a$, but with opposite phase from that of the case I.

Hence the amplitude modulation at frequency $f_a$ of the first order side band produced by periodically sweeping $\Delta f_0$ a fixed percentage at a rate $f_a$ is indicative by its phase-sense of whether B is above or below the first maximum of $J_1$ at 1.84, this modulation being of opposite phase on opposite sides of the maximum and being minimum and substantially null at the maximum.

Accordingly, by the present invention this modulation is derived as a control signal by isolating and detecting the first order side band, and the control signal is used to drive an attenuator in a direction to adjust $\overline{\Delta f_0}$ in a sense to vary B toward the value 1.84 and to maintain B at that value. For each value of range R, there will be a different unique value of $\overline{\Delta f_0}$ which will produce $B = 1.84$, and there will therefore be a corresponding unique position of the attenuator. Hence an indicator calibrated in range R can be directly driven with the attenuator to indicate range.

FIG. 5 shows a general schematic diagram of the present system. A modulation oscillator 11 of any suitable type is adapted to produce an output signal of constant frequency $f_1$. In one illustrative system this frequency $f_1$ might be of the order of 25 kilocycles per second. A control frequency oscillator 12 similarly provides an output frequency $f_a$. In one example used this frequency might be of the order of 400 cycles per second. The two outputs of oscillators 11 and 12 are supplied to an amplitude modulator 13 of any conventional type by which the control frequency $f_a$ is modulated upon the modulating oscillator $f_1$ to produce an ordinary amplitude-modulated wave of carrier $f_1$ and modulation $f_a$. The output of the amplitude modulator 13 is impressed across a suitable voltage-varying device 14, indicated schematically as a potentiometer, the position of whose adjustable tap 16 then determines the magnitude of AM signal passed by lead 17 to a frequency-modulation transmitter having a carrier of frequency $f_0$ produced in any convenient manner. In an illustrative embodiment the transmitter 18 may be formed by a reflex klystron having a carrier frequency $f_0$ of the order of 10,000 megacycles per second, which is frequency-modulated by the AM signal of center frequency $f_1$ appearing on lead 17 by having this AM signal supplied to the repeller electrode of the reflex klystron. It will be understood that this invention is not limited to this type of transmitter nor to this value of $f_0$, since $f_0$ could have any suitable value, desirably from the order of a 100 megacycles up. The apparatus thus far described corresponds to source S of FIG. 1.

The output of transmitter 18 is then radiated by a suitable antenna system 19 (corresponding to antenna TA of FIG. 1) toward the reflecting body (such as ground, terrain, or target) whose range, clearance, distance or altitude is to be indicated. The signal reflected from that body is picked up by a suitable receiving antenna 21 (RA of FIG. 1) and supplied to a mixer 22 (or M of FIG. 1) preferably of the balanced type. At the same time a reduced level portion of the output of transmitter 18 is picked up in any suitable way, as by a directional coupler 23, and is supplied to a phase shifter 24 driven by a sub-carrier oscillator 26 of frequency $f_s$. In an illustrative example, the frequency $f_s$ may be of the order of 562 kilocycles per second. The phase shifter 24 may be of the type shown in the aforesaid Goldberg application Serial No. 614,491, or that described in the copending further application Serial No. 644,047 of Harold Goldberg, filed March 5, 1957, and now abandoned, and entitled "Transponder Systems," and produces a continuous step-wise phase shift having the effect of a linearly varying phase shift. As described in these two Goldberg applications, the phase shifter 24 in combination with the sub-carrier oscillator 26 serves to shift the frequency of the input to the phase shifter by the value of the sub-carrier frequency $f_s$. Any desired frequency-shifter or translator could be used. By way of example this frequency translation can be accomplished as follows. The phase shifter 24 may be formed by two balanced modulators to which the frequency-modulated carrier wave of frequency $f_0$ is applied with a phase difference of 90 degrees. The modulating voltages of frequency $f_s$ are applied to these modulators also with a 90 degree phase difference. When the two modulator outputs are added or subtracted, one of the side bands is cancelled out. The carrier component is also cancelled out in each modulator, so that the net output contains a single side band and no carrier, which represents essentially a translation of the carrier $f_0$ by the amount $f_s$. Certain higher order side bands may be present, which may be generally ignored because of their reduced amplitudes, or may be filtered out. The directional coupler 23, phase shifter 24, and associated structure here form the local path LP of FIG. 1. As taught in the prior Goldberg applications, the phase shifter could also be inserted alternatively in the received path RP or the transmitted path TP.

In this way, as demonstrated above, the output of the mixer M constitutes a wave having the form of a frequency-modulated carrier of frequency $f_s+f_D$ (where $f_D$ is the doppler frequency due to movement of the reflecting body) having a modulating signal which is the frequency $f_1$ amplitude modulated by $f_a$ (i.e., of the form $(1+m \cos 2\pi f_a t) \cos 2\pi f_1 t$, $m$ being the percentage modulation of $f_a$ upon $f_1$), and having a modulation index B which is given by (6.8) above. However, because of the amplitude modulation of $f_1$ at a rate $f_a$, this modulation index B will vary periodically at the frequency $f_a$ for each value of range.

Figure 6A:
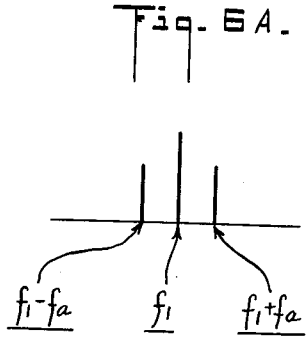
FIGS. 6A to 6D are charts of spectral distribution of signals at various points of the system.
Figure 6B:
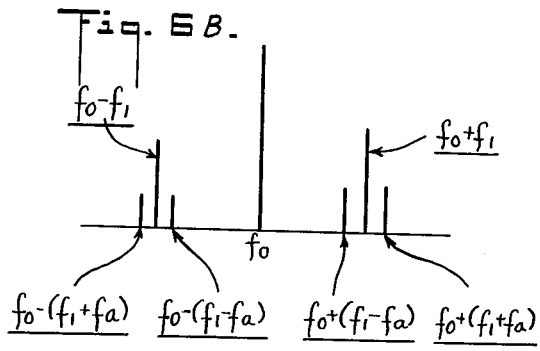
Figure 6C:
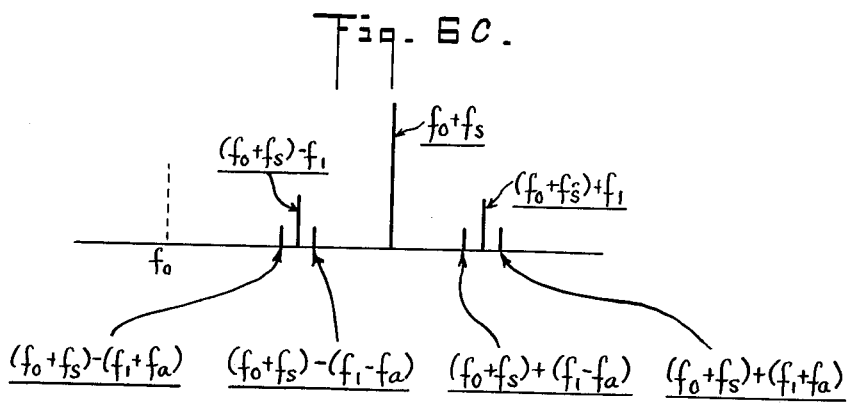

FIGS. 6A, 6B, 6C and 6D illustrate the various frequency components involved. The output of the amplitude modulator 13 is a conventional AM carrier whose spectrum is shown in FIG. 6A, having a carrier component of frequency $f_1$ and upper and lower side bands of frequency $f_1+f_a$ and $f_1-f_a$. The radiated wave has a carrier frequency $f_0$ which is frequency-modulated by the output of the amplitude modulator 13. Accordingly, in usual fashion a plurality of side bands would be expected to occur above and below the carrier frequency $f_0$, each set of side bands being spaced from the carrier frequency $f_0$ by the modulating frequency or a multiple thereof. FIG. 6B illustrates the first order side bands above and below the carrier. It will be understood that this diagram is not intended to represent relative amplitudes of these side bands. As indicated, each side band is formed by a sub-carrier $f_0 \pm f_1$ spaced from the main carrier $f_0$ by the modulating frequency $f_1$ and the sub-carrier in turn has upper and lower side bands spaced on either side of it by the control frequency $f_a$. As shown in FIG. 6C, the output of phase shifter 24 is essentially the same as that of FIG. 6B except that what was the carrier frequency $f_0$ of FIG. 6B now has the value $f_0+f_s$.

Figure 6D:
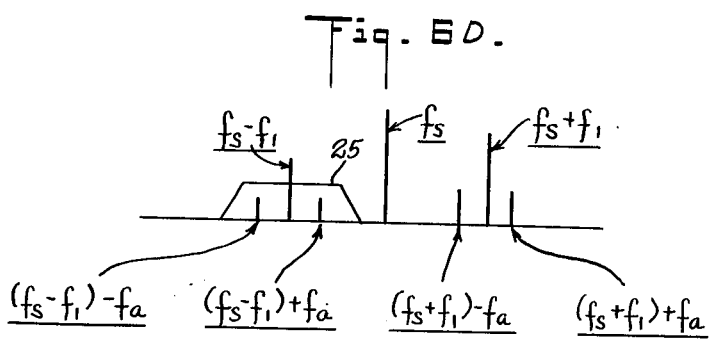

Ignoring higher than first order side bands, and the doppler effect, the output of the balanced mixer 22 will then comprise the sub-carrier frequency $f_s$ with an upper side band spaced by an amount $f_1$ therefrom and amplitude-modulated at $f_a$, plus a lower side band also spaced from the sub-carrier $f_s$ by an amount $f_1$ and similarly amplitude modulated at the frequency $f_a$. Higher order side bands also exist, but are of no concern here. This is illustrated in FIG. 6D.

The output of the balanced mixer 22 is then passed to conventional intermediate-frequency or difference-frequency amplifier 27 which has a frequency acceptance band which passes only one first order side band of the mixer output (illustratively indicated in FIG. 6D at 25 as the lower side band that is, $f_s-f_1$, amplitude-modulated by $f_a$) and rejects all other components including the sub-carrier $f_s$ and the other (higher) first order side band thereof and all higher order side bands. The output of the IF amplifier 27 is therefore a simple amplitude-modulated wave with carrier frequency equal to $f_s-f_1$ and modulated frequency $f_a$. In the presence of doppler shift, the carrier frequency changes slightly and becomes $(f_s+f_0-f_1)$, similarly amplitude modulated. This is passed to a conventional amplitude-modulation detector 28 whose output will have components of the frequency $f_a$ and multiples thereof. This output is supplied to a low pass filter 29 which is tuned to the frequency $f_a$ so that it suppresses all harmonics of $f_a$ and passes only the component $f_a$. The low pass filter 29 may be of any suitable type, such as an amplifier stage having a negative feedback loop tuned sharply to reject $f_a$ as by means of a split-T network. This signal of frequency $f_a$, which may be termed an error or control signal, is used to drive a motor 31 to a position corresponding to the null value of $f_a$ by any suitable means. By way of example, the control signal $f_a$ is supplied to a phase-splitter 36 to produce a balanced signal which is amplified in a push-pull amplifier 37 and then is supplied to one winding 38 of a two-phase motor 31 having a second winding 39 which is provided with a reference signal of frequency $f_a$ from the control frequency oscillator 12 in quadrature with the phase of the output from amplifier 37. Motor 31 is coupled to arm 16 of modulation control 14 in any suitable manner.

The control signal $f_a$ is essentially the amplitude modulation produced by the periodic variation of the frequency deviation of the transmitter 18 produced by the control frequency oscillator 12 by way of the amplitude modulator 13. As indicated with respect to FIG. 4, the control signal $f_a$ derived from the filter 29 will have a predetermined phase sense when the average modulation index of the mixer output is below the peak value 1.84 and an opposite phase-sense when that average value is above 1.84. Motor 31 is connected so that a given phase sense of control signal $f_a$ will rotate motor 31 in a direction to vary modulation control 14 in a sense to adjust the average frequency deviation $\overline{\Delta f_0}$ of transmitter 18 in the proper direction to vary B so as to drive $J_1(B)$ toward its peak value; that is, to vary the average value $\overline{B}$ of modulation index B toward the value 1.84. When $\overline{B}$ is about 1.84, the control signal from detector 28 becomes a multiple of $f_a$, which is suppressed by filter 29 so that the motor amplifier 37 then has a null signal and the motor will stop. The motor would run in opposite direction toward the null for opposite phase sense of $f_a$, and thereby follows the null.

Therefore for each range value the motor 31 automatically readjusts $\overline{\Delta f_0}$ so that $\overline{B}$ remains at 1.84.

Coupled to the motor 31 is a rate generator 49 which in well known fashion produces a signal of the frequency $f_a$ and an amplitude proportional to the rate of change of motor position. This rate signal is fed back to the input of phase splitter 36 by a lead 42 for rate-damping of motor 31.

The range indicator 32 is also coupled to and driven directly by motor 31. Since each position of motor 31 represents a unique value of $\overline{\Delta f_0}$ for $\overline{B}$ constant at 1.84, each motor position also represents a unique value of range, and indicator 32 may be suitably calibrated to read range directly. It is desirable that the indicator 32 have an expanded scale at the low range end, where small variations become more significant, and a logarithmic scale is provided in the present system by suitably contouring control 14 in an exponential manner.

The present invention provides a simple arrangement for obtaining the rate of change of range. For this purpose the rate generator output is also supplied by way of lead 43 to range-rate-compensating potentiometer 44. The arm 46 of potentiometer 44 is driven by motor 31, as indicated by the dash-line coupling 48. It will be understood that the output of the rate generator, while proportional to the speed of the motor 31, is not proportional to the rate of change of range because of the logarithmic scale factor just indicated. By also supplying the rate generator output by lead 43 to linear potentiometer 44 whose arm 46 is driven by motor 31, the signal picked up by the arm 46 becomes proportional to the actual rate of change of range and this may be suitably indicated on a range rate signal indicator 47 or supplied to an autopilot or remote computer or indicator for use in obvious fashion.

According to one feature of the present invention, the possibility of false lock-in on the wrong peak of the $J_1(B)$ curve is minimized by the use of a sufficiently high percentage modulation $m$ for the amplitude modulator. In this way, for values of $\overline{B}$ adjacent higher peaks of $J_1$, the amount of swing of $\Delta f_0$ and hence of B due to the $f_a$ modulation of the transmitter modulating signal will be sufficient to cause B to vary over a number of zeros and/or peaks, which creates multiples of $f_a$ in the output of detector 28 and reduces the fundamental to a value often insufficient to actuate motor 31. In addition, it has been discovered that any fundamental component which exists then has the same phase sense for all values of $\overline{B}$ above 1.84, so that the control signal will drive the motor past all other maxima of $J_1$ until it locks in on $\overline{B}=1.84$. The amount of percentage modulation required for this may vary according to the parameters and characteristics of the various components, but values of from 30% to 70% may be used.

In addition to, or in place of this latter feature, an arrangement such as that of FIG. 7 may be used to assure that the motor 31 keeps the indicator at maximum range value whenever there is no control signal. This assures that the system will always approach $\overline{B}=1.84$ from the low side, and avoid any harmful effects due to higher maxima or zeros. It will be understood that the remainder of the system of FIG. 5 will be employed with the circuit of FIG. 7, as indicated.

In FIG. 7 the D.C. output of the amplitude detector 28 is suitably amplified as at 50, and serves to actuate a relay 49 having single-pole, double-throw contacts. As is well known, so long as the IF amplifier 27 is supplied with an input signal to be detected by detector 28, there will be a D.C. detector output, which is utilized to maintain relay 49 deenergized, in which condition its left contact will connect the amplitude detector 28 to the low-pass filter 29 in the same manner as indicated in FIG. 5. However, should the signal fail for any reason, relay 49 becomes energized to transfer the input for the low pass filter 29 to the control frequency oscillator 12, which supplies a voltage of the frequency $f_a$ and of a constant value which will drive the motor 31 to its extreme upper range indicating limit. By way of example this may be 3000 feet. At the same time a signal light or other indication may be actuated in any obvious manner to give warning that the maximum range reading is due only to signal failure. It will be understood that any suitable means of indicating this condition may be utilized, such as visible or aural signals or masking the pointer of the range indicator 32 at its maximum position.

When the motor 31 has driven the range indicator 32 to the maximum position, it simultaneously drives the modulation control 14 to the position giving minimum frequency deviation $\Delta f_0$ for the transmitter. When the received signal is restored, as by turning on the apparatus, relay 49 is deenergized to reconnect the filter 29 to detector 28. At the first moment, $\Delta f_0$ will be very small, producing a small value of $\overline{B}$, much less than 1.84. This will produce a signal of frequency $f_a$ of the phase-sense required to reduce the range indication and increase $\overline{\Delta f_0}$, until $\overline{B}=1.84$, when motor 31 stops, as desired. In this way it is assured that the motor always locks in at the first peak value (1.84) of $\overline{B}$.

Through a mechanical connection 51 the motor 31 also drives the variable arm 33 of an automatic gain control potentiometer 34 connected between a suitable source of negative bias and ground. Arm 33 is connected in obvious manner to a suitable stage of the IF amplifier 27 to control the gain of the amplifier. It will be understood that the magnitude of the signal supplied to the IF amplifier 27 will vary widely over the intended range of the device which may for example be from 3 feet to 3000 feet during which the received signal may vary by as much as 60 db. To be sure that the motor 31 is always provided with sufficient signal for control purposes, conventional automatic gain control may be incorporated in the IF amplifier 27 and in addition the gain of the amplifier may be mechanically controlled in direct correspondence with the range by use of the gain control potentiometer 34 so as to increase the gain of the amplifier 27 for higher altitudes where the receiver signal will be smallest.

It will be understood that any other suitable way of adjusting motor 31 to the null value of the control signal $f_a$ may be utilized including conventional phase-sensitive and remote positioning circuits.

Accordingly, it will be seen that the present specific embodiment of the invention has provided a system by which a frequency modulated signal derived by mixing the return of a frequency-modulated signal from a distant body with a frequency-shifted version of the transmitted signal has range information extracted from its first side band, and this information is utilized to maintain the system in a condition maximizing the first side band. As indicated above, the motor 31 adjusts the output of modulator 13 so as to adjust the magnitude of the modulating signal applied to the FM transmitter 18. This in turn varies the frequency deviation $\Delta f_0$ of the FM output from transmitter 18. By radiating the FM wave, receiving a reflected return from a distant body, and mixing the return signal with a frequency-shifted version of the transmitted signal, an FM signal is obtained whose modulation index B is a function of both $\Delta f_0$ and the range of the body. The system operates to maintain the modulation index B at a value for which the first order Bessel function (which determines the amplitude of the first side band) is maximum, namely 1.84. By thus maximizing the first order Bessel function, the system maintains the mixer output signal SM at a maximum value for the first order (or higher order) side band. In so doing, in accordance with the derivation given above, the adjustment of the modulation index B is directly representative of the range. It will be understood that the control frequency oscillator producing $f_a$ has as its primary function the provision of means for enabling automatic maximizing of the first order side band of the mixer output signal.

Where desired, if the transmitter is formed by a reflex klystron, means may be provided for centering the klystron power output at the peak of its power characteristic by sampling the power output of the klystron (which is modulated at $f_1$) and comparing the phase of that modulation with the original $f_1$ modulating signal. The phase relationship of these two signals may be used to derive a correction voltage which is applied to the repeller electrode to keep the klystron at the peak of its power mode. A similar arrangement is described in the above-mentioned application Serial No. 614,491.

While in the above system, the frequency modulation of the transmitter has been described as sinusoidal at frequency $f_1$ (amplitude modulated at $f_a$), this is not essential since other types of modulating signal may be used. In particular, square-wave modulation at $f_1$ offers certain advantages.

Also, the analysis given above indicates that each of the side bands of $S_M$ contains range information in the form of its amplitude modulation $f_a$, so that higher order side bands than the first could be used to lock in motor 31, by merely tuning IF amplifier 27 thereto. However, particularly because in the first order function $J_1$ there is a greater variation between the amplitudes of the first few maxima, the first order side band is preferred.

In addition, operation is possible, but in a somewhat degraded fashion, if phase shifter 24 is replaced by a balanced modulator, or is omitted entirely. In such case, the doppler frequency $f_D$ should be small or great compared to $f_a$.

The present invention has therefore provided a greatly improved system for distance and velocity determination useful as an altimeter, a terrain clearance indicator, an obstacle detector, for radar ranging or the like, in which simple conventional-type apparatus provides highly useful and accurate results without ambiguity and solves the problem of feedthrough. It will be clear that the distance being indicated could be range to a target or an obstacle or the altitude above ground or other terrain.

Since many apparently widely differing systems can readily be devised within the principles set forth above, it is to be understood that the foregoing description is intended to be illustrative only and is not to be taken in a limiting sense, the scope of the invention being defined solely by the appended claims.

What is claimed is:

1. In a continuous-wave frequency-modulation radio distance measuring system having means for radiating a frequency-modulated carrier wave, means for receiving said frequency-modulated carrier wave after reflection from a spaced body, and means for producing from said received wave a signal having the waveform of a frequency-modulated wave whose modulation index is a function both of range to said body and of the frequency deviation of said radiated carrier wave, the improvement comprising means, including means for adjusting a characteristic of said radiated wave for maintaining a predetermined side band of said produced signal at a maximum amplitude despite changes in distance to said body, and a distance indicator responsive to said adjusting means.

2. In a continuous-wave frequency modulation radio distance-measuring system having means for radiating a frequency-modulated carrier wave, means for receiving said frequency-modulated carrier wave after reflection from a spaced body, and means for producing from said received wave a signal having the waveform of a frequency-modulated wave whose modulation index is a function both of range to said body and of the frequency deviation of said radiated carrier wave, the improvement comprising means, including means for adjusting said frequency deviation, for maintaining a predetermined side band of said produced signal at a maximum value, and range-indicating means responsive to said adjusting means.

3. Radio distance-measuring apparatus comprising means for radiating a frequency-modulated carrier wave, means for receiving said frequency-modulated carrier wave after reflection from a spaced body, means for producing from said received wave a signal having the waveform of a frequency-modulated wave whose modulation index is a function both of range to said body and of the frequency deviation of said radiated carrier wave, means for adjusting said frequency deviation to maintain a predetermined side band of said produced signal at a maximum value, and range-indicating means responsive to said adjusting means.

4. A continuous-wave frequency-modulation radar system comprising means for radiating a carrier wave frequency-modulated by a modulating signal, means for receiving said wave after reflection from a distant body, means for producing a local wave from said transmitted wave, means for frequency-shifting one signal from the group consisting of said transmitted, received and local signals, means for thereafter mixing said local and received waves to produce a difference-frequency signal, whereby said difference-frequency signal has the wave form of a frequency-modulated carrier having side band components and having a modulation index which is a function of range and of the frequency deviation produced by the modulating signal of said radiated frequency-modulated carrier wave, and means responsive to said difference-frequency signal for varying said modulating signal to maintain a maximum value of a predetermined one of the side bands of said difference-frequency signal, whereby the amount of adjustment of said modulating signal is indicative of said range.

5. In a continuous-wave frequency-modulation radio distance-measuring system having means for radiating a frequency-modulated carrier wave, means for receiving said frequency-modulated carrier wave after reflection from a spaced body, and means for producing from said received wave a signal having the waveform of a frequency-modulated wave whose modulation index is a function both of range to said body and of the frequency deviation of said radiated carrier wave, the improvement comprising means, including means for adjusting a characteristic of said radiated wave for maintaining a predetermined side band of said produced signal at a fixed condition, means simultaneously suppressing the carrier component of said produced signal, whereby feed-through effects are avoided, and a distance indicator responsive to said adjusting means.

6. A frequency-modulated continuous wave distance-indicating system comprising a carrier wave source, means for frequency-modulating said carrier wave, means for radiating said modulated carrier wave to a distant point, means for receiving said modulated carrier wave after reflection at said distant point, means for deriving a local wave from said modulated carrier wave, means for frequency-shifting one wave from the group consisting of said radiated received and local waves means for thereafter mixing said local and received waves to derive a difference wave having the wave form of a frequency-modulated wave, and means for utilizing said difference wave to indicate the distance to said distant point, said last means including means for maintaining substantially constant the modulation index of said difference wave.

7. Radio distance measuring apparatus comprising means for radiating a frequency-modulated carrier wave, means for receiving said frequency-modulated carrier wave after reflection from a spaced point, means for deriving a local wave from said carrier wave, means for mixing said local wave with said received wave to produce a difference-frequency signal, means for causing said difference-frequency signal to assume the waveform of a frequency-modulated wave whose modulation index is a function of distance to said point, and means responsive to said difference-frequency frequency-modulated wave for maintaining a constant value of said modulation index despite variations in the distance of said point.

8. A frequency-modulated continuous-wave distance-indicating system comprising a carrier wave source, a modulating wave source, means for frequency-modulating said carrier wave by said modulating wave, means for radiating said modulated carrier wave to a distant point, means for receiving said modulated carrier wave after reflection at said distant point, means for deriving a local wave from said modulated carrier wave, a source of sub-carrier wave, means controlled by said sub-carrier source for substantially continuously shifting the phase of one wave of the group consisting of said radiated wave, said local wave and said received wave, at a substantially uniform rate correlated to the frequency of said sub-carrier source, means for thereafter mixing said received wave with said local wave to produce a heterodyne signal representing the difference frequencies of said mixed waves, the output of said mixing means being thereby said sub-carrier frequency-modulated at said modulating frequency and with a frequency deviation representative of the distance to said distant point, and means responsive to the frequency deviation of said mixing means output for indicating said distance.

9. Radio distance-measuring apparatus comprising means for radiating a frequency-modulated carrier wave, means for receiving said frequency-modulated carrier wave after reflection at a spaced-point, means for deriving a local wave from said carrier wave, means for mixing said local wave with said received wave to produce a difference-frequency signal, means for causing said difference-frequency signal to have the waveform of a frequency-modulated wave whose modulation index is a function of distance to said body, indicator means responsive to said difference-frequency frequency-modulated wave, and means for suppressing the carrier component of said last-named wave in advance of said indicator means, whereby the effect of feed-through is reduced.

10. Radio distance measuring apparatus comprising a carrier frequency oscillator for producing a carrier wave, means for producing a signal of a first predetermined frequency, means for amplitude modulating said signal at a control frequency to produce an amplitude-modulated modulating signal, means for frequency-modulating said carrier wave by said modulating signal, means for radiating said frequency-modulated carrier wave, means for receiving said radiated wave after reflection from a spaced body, means for deriving a local wave from said radiated wave, means for frequency-shifting said local wave by a predetermined amount, means for mixing said local and received waves to produce a frequency-modulated difference-frequency signal having a modulation index which is a function of range, means for selecting a first order side band of said difference-frequency signal, means for detecting said selected side band to produce a reversible-phase control signal of said control frequency, having substantially a null at a maximum value of said side band amplitude as a function of said modulation index, and means for varying the amplitude of said modulating signal by said control signal to adjust said modulation index to maintain said selected side band at a peak of its amplitude versus modulation index characteristic.

11. Radio distance-measuring apparatus comprising means for producing a first signal of a predetermined frequency, means for amplitude-modulating said signal at a control frequency to form a modulating signal, a carrier wave source, means for frequency-modulating the output of said carrier wave source by said modulating signal, means for radiating said frequency-modulated output wave, means for receiving said frequency-modulated output wave after reflection from a spaced body, means for deriving a local wave from said output wave, means for mixing said local wave with said received wave to produce a difference-frequency signal, means for frequency-shifting said local wave prior to said mixing to cause said difference-frequency signal to assume the wave form of a frequency-modulated wave with a modulation index which is a function of the range of said body and of said control frequency, means responsive to said difference-frequency wave for maintaining a constant average value of modulation index for said difference-frequency signal despite variations in range of said body, and a range indicator coupled to said last means.

12. A continuous-wave frequency-modulation radio distance-measuring system comprising means for radiating a frequency-modulated carrier-wave, means for receiving said carrier wave after reflection from a spaced point, means for producing a local signal wave, means for mixing said local and received waves to produce a heterodyne signal, means responsive to said heterodyne signal for indicating the distance to said point, and means responsive to cessation of said heterodyne signal for causing said indicating means to indicate an extreme distance condition.

13. In a continuous-wave frequency-modulation radio distance-measuring system having means for radiating a frequency-modulated carrier wave, means for receiving said frequency-modulated carrier wave after reflection from a spaced body, and means for producing from said received wave a signal having the waveform of a frequency-modulated wave whose modulation index is a function both of range to said body and of the frequency deviation of said radiated carrier wave, the improvement comprising means, including means for adjusting a characteristic of said radiated wave, for maintaining a predetermined characteristic of said produced signal at a fixed condition, range-indicating means responsive to said adjusting means, and means responsive to cessation of said produced signal for actuating said range-indicating means to a maximum value.

14. In a continuous-wave frequency-modulation radio distance-measuring system having means for radiating a frequency-modulated carrier wave, means for receiving said frequency-modulated carrier wave after reflection from a spaced body, means for producing from said received wave a signal having the waveform of a frequency-modulated wave whose modulation index is a function both of range to said body and of the frequency deviation of said radiated carrier wave, the improvement comprising means for adjusting the frequency deviation of said radiated wave to maintain a predetermined sideband of said produced signal at a maximum amplitude, a distance indicator responsive to said adjusting means, and means responsive to cessation of said produced signal for maintaining said deviation at a minimum value.

15. In a continuous-wave frequency-modulation radio distance-measuring system having means for radiating a frequency-modulated carrier wave, means for receiving said frequency-modulated carrier wave after reflection from a spaced body, and means for producing from said received wave a signal having the waveform of a frequency-modulated wave whose modulation index is a function both of range to said body and of the frequency deviation of said radiated carrier wave, the improvement comprising means for periodically varying the frequency deviation of said radiated carrier at a predetermined control frequency, means for deriving from said produced signal a control signal of said control frequency, means responsive to said control signal for maintaining a predetermined characteristic of said first produced signal in a fixed condition, a range-indicator responsive to said last means, and means responsive to cessation of said produced signal for substituting a fixed signal of said control frequency for said derived signal.

16. A continuous-wave frequency-modulation radio distance-measuring system comprising means for radiating a frequency-modulated carrier wave, means for receiving said carrier wave after reflection from a spaced point, means for producing from said received wave a signal having the waveform of a frequency-modulated wave whose modulation index is a function both of range to said point and of the frequency deviation of said radiated carrier wave, means for periodically varying said frequency deviation at a predetermined control frequency, means for deriving from said produced signal a control signal of said control frequency, last means including means for maintaining a predetermined sideband component of said produced signal in a predetermined amplitude condition.

17. A radio distance and velocity determining system comprising a range indicator having a logarithmic scale, means for driving said indicator, rate means actuated by said driving means for producing a signal corresponding to the rate of change of position of said indicator, a potentiometer having a driven arm, means supplying said signal to said potentiometer, and means actuating said arm in correspondence with said indicator, whereby the signal produced by said potentiometer corresponds to range rate.

18. A continuous-wave frequency-modulation radio distance-measuring system comprising means for radiating a frequency-modulated carrier wave, means for receiving said carrier wave after reflection from a spaced point, means for producing from said received wave a signal having the waveform of a frequency-modulated wave whose modulation index is a function both of range to said point and of the frequency deviation of said radiated carrier wave, means for periodically varying said frequency deviation at a predetermined control frequency, means for deriving from said produced signal a control signal of said control frequency, and means responsive to said control signal for indicating the rate of change of distance to said point.

19. A continuous-wave frequency-modulation radio distance measuring system comprising means for radiating a frequency-modulated carrier wave, means for receiving said frequency-modulated carrier wave after reflection from a spaced body, means for deriving a local wave from said frequency-modulated carrier wave, means for mixing said local wave and said received wave to form a heterodyne wave, said receiving means including amplifier means for amplifying said heterodyne wave, means responsive to said amplifier means for indicating the range of said body, and means actuated conjointly with said indicating means for adjusting the gain of said amplifier means in correspondence with said range.

20. A continuous-wave frequency-modulation radio distance-measuring system comprising means for radiating a frequency-modulated carrier wave, means for receiving said carrier wave after reflection from a spaced point, means for producing a local wave, means for mixing said local and received waves to produce a heterodyne signal, means selecting a single sideband component of said heterodyne signal, and means maintaining a characteristic of said component in a predetermined amplitude condition by varying the modulation of said radiated carrier wave.

21. A system as in claim 20 wherein said condition is a peak amplitude and further including means for preventing said characteristic from locking-in on undesired peaks.

References Cited in the file of this patent

UNITED STATES PATENTS

| | | |
|---|---|---|
| 2,248,599 | Alexanderson | July 8, 1941 |
| 2,253,975 | Guanella | Aug. 26, 1941 |
| 2,257,830 | Woff et al. | Oct. 7, 1941 |
| 2,268,587 | Guanella | July 6, 1942 |
| 2,416,351 | Schelleng | Feb. 25, 1947 |
| 2,466,534 | Cole | Apr. 5, 1949 |
| 2,537,593 | Landon et al. | Jan. 9, 1951 |
| 2,791,766 | Luck | May 7, 1957 |
| 2,834,956 | Harris | May 13, 1958 |
| 2,907,023 | Skinner | Sept. 29, 1959 |
| 3,026,515 | Rey | Mar. 20, 1962 |
| 3,054,104 | Wright et al. | Sept. 11, 1962 |